(12) United States Patent
Choi et al.

(10) Patent No.: US 11,436,215 B2
(45) Date of Patent: Sep. 6, 2022

(54) SERVER AND CONTROL METHOD THEREOF

(71) Applicant: SAMSUNG ELECTRONICS CO., LTD., Suwon-si (KR)

(72) Inventors: Hyungtak Choi, Suwon-si (KR); Seungsoo Kang, Suwon-si (KR); Sunhwa Ko, Suwon-si (KR); Jihie Kim, Suwon-si (KR); Hyunwoo Park, Suwon-si (KR); Haehun Yang, Suwon-si (KR); Daye Lee, Suwon-si (KR); Siddarth K M, Seoul (KR); Inchul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 16/545,388

(22) Filed: Aug. 20, 2019

(65) Prior Publication Data
US 2020/0057758 A1 Feb. 20, 2020

(30) Foreign Application Priority Data

Aug. 20, 2018 (KR) .................. 10-2018-0096705
Aug. 14, 2019 (KR) .................. 10-2019-0099452

(51) Int. Cl.
*G06F 16/23* (2019.01)
*G06F 16/22* (2019.01)

(52) U.S. Cl.
CPC .......... *G06F 16/2365* (2019.01); *G06F 16/22* (2019.01)

(58) Field of Classification Search
None
See application file for complete search history.

(56) References Cited

U.S. PATENT DOCUMENTS

| 4,931,950 A | 6/1990 | Isle et al. |
| 5,793,762 A | 8/1998 | Penners et al. |
| 5,822,529 A | 10/1998 | Kawai |
| 6,071,236 A | 6/2000 | Iliff |

(Continued)

FOREIGN PATENT DOCUMENTS

| KR | 10-1072176 | 10/2011 |
| KR | 10-2014-0065719 | 5/2014 |
| KR | 10-1797856 | 11/2017 |

*Primary Examiner* — Irene Baker
(74) *Attorney, Agent, or Firm* — Nixon & Vanderhye P.C.

(57) ABSTRACT

A server and a control method thereof are disclosed. The control method of a server includes receiving knowledge information from a first electronic device, storing the received knowledge information in a personal knowledge database corresponding to a user using the first electronic device, transmitting a response to an inquiry to obtain the knowledge information to at least one second electronic device based on the knowledge information stored in the personal knowledge database, based on the inquiry being received from the at least one second electronic device, receiving feedback information to the response from the at least one second electronic device, and storing the knowledge information in a global knowledge database based on the feedback information. At least a part of a method of allowing a server to provide a response to a user inquiry may use an artificial intelligence model learned according to at least one of machine learning, neural networks, or deep learning algorithms.

16 Claims, 10 Drawing Sheets

(56) References Cited

U.S. PATENT DOCUMENTS

| | | |
|---|---|---|
| 6,360,172 B1 | 3/2002 | Burfeind et al. |
| 6,411,936 B1 | 6/2002 | Sanders |
| 6,446,076 B1 | 9/2002 | Burkey et al. |
| 6,499,021 B1 | 12/2002 | Abu-Hakima |
| 6,526,395 B1 | 2/2003 | Morris |
| 6,740,802 B1 | 5/2004 | Browne, Jr. |
| 6,767,211 B2 | 7/2004 | Hall et al. |
| 6,829,603 B1 | 12/2004 | Chai et al. |
| 7,036,128 B1 | 4/2006 | Julia et al. |
| 7,137,126 B1 | 11/2006 | Coffman et al. |
| 7,167,899 B2 | 1/2007 | Lee et al. |
| 7,177,316 B1 | 2/2007 | Pilecek |
| 7,222,301 B2 | 5/2007 | Makagon et al. |
| 7,389,252 B2 | 6/2008 | Robb et al. |
| 7,398,209 B2 | 7/2008 | Kennewick et al. |
| 7,469,384 B2 | 12/2008 | Thompson et al. |
| 7,539,656 B2 | 5/2009 | Fratkina et al. |
| 7,542,902 B2 | 6/2009 | Scahill et al. |
| 7,620,549 B2 | 11/2009 | Di Cristo et al. |
| 7,640,160 B2 | 12/2009 | Di Cristo et al. |
| 7,640,209 B1 | 12/2009 | Brooks et al. |
| 7,693,720 B2 | 4/2010 | Kennewick et al. |
| 7,769,705 B1 | 8/2010 | Luechtefeld |
| 7,814,041 B2 | 10/2010 | Caporale et al. |
| 7,890,382 B2 | 2/2011 | Robb et al. |
| 7,929,464 B2 | 4/2011 | Petrovykh |
| 7,953,219 B2 | 5/2011 | Freedman et al. |
| 7,953,613 B2 | 5/2011 | Gizewski |
| 8,015,006 B2 | 9/2011 | Kennewick et al. |
| 8,069,131 B1 | 11/2011 | Luechtefeld et al. |
| 8,184,797 B1 | 5/2012 | Rosen |
| 8,195,468 B2 | 6/2012 | Weider et al. |
| 8,248,237 B2 | 8/2012 | Fitzgerald et al. |
| 8,311,513 B1 | 11/2012 | Nasserbakht et al. |
| 8,332,224 B2 | 12/2012 | Di Cristo et al. |
| 8,370,160 B2 | 2/2013 | Pearce et al. |
| 8,370,917 B1 | 2/2013 | Hayes et al. |
| 8,386,569 B2 | 2/2013 | Stark et al. |
| 8,468,060 B2 | 6/2013 | Robb et al. |
| 8,537,997 B2 | 9/2013 | Gits et al. |
| 8,676,833 B2 | 3/2014 | Chunilal |
| 8,695,074 B2 | 4/2014 | Saraf et al. |
| 8,719,909 B2 | 5/2014 | Fitzgerald et al. |
| 8,731,929 B2 | 5/2014 | Kennewick et al. |
| 8,784,114 B2 | 7/2014 | Bergan |
| RE45,132 E | 9/2014 | Caporale et al. |
| 8,831,677 B2 | 9/2014 | Villa-Real |
| 8,849,908 B2 | 9/2014 | Stanzione et al. |
| 9,008,283 B2 | 4/2015 | Riahi et al. |
| 9,119,050 B1 | 8/2015 | Metcalf |
| 9,288,000 B2 | 3/2016 | Kraenzel |
| 9,418,661 B2 | 8/2016 | Fay et al. |
| RE46,153 E | 9/2016 | Makagon et al. |
| 9,531,862 B1 | 12/2016 | Vadodaria |
| 9,589,390 B2 | 3/2017 | De Stories et al. |
| 9,600,499 B2 | 3/2017 | Kutaragi et al. |
| 9,634,855 B2 | 4/2017 | Poltorak |
| 9,703,943 B2 | 7/2017 | Saraf et al. |
| 9,730,036 B2 | 8/2017 | Langevin et al. |
| 9,747,279 B2 | 8/2017 | Boies et al. |
| 9,792,560 B2 | 10/2017 | Jeong et al. |
| 9,922,642 B2 | 3/2018 | Pitschel et al. |
| 2002/0091741 A1* | 7/2002 | Ferreira ............... G06F 40/166 707/999.009 |
| 2008/0082393 A1* | 4/2008 | Ozzie .................. G06Q 10/063 705/7.11 |
| 2009/0162824 A1* | 6/2009 | Heck ..................... G06N 3/004 434/322 |
| 2011/0302098 A1* | 12/2011 | Yoshida ............. G06F 16/9535 705/319 |
| 2011/0302117 A1* | 12/2011 | Pinckney ............... G06N 20/00 706/12 |
| 2012/0117115 A1* | 5/2012 | Convertino ......... G06Q 10/107 707/E17.014 |
| 2012/0197979 A1* | 8/2012 | Palm .................. G06Q 30/0282 709/203 |
| 2013/0024457 A1* | 1/2013 | Chua ...................... G06F 16/30 707/E17.046 |
| 2013/0031574 A1* | 1/2013 | Myslinski ............. G06Q 10/10 725/14 |
| 2014/0201629 A1 | 7/2014 | Heck |
| 2014/0279996 A1* | 9/2014 | Teevan ................... G06F 16/38 707/706 |
| 2015/0128285 A1* | 5/2015 | LaFever .............. H04L 63/0414 726/26 |
| 2015/0317339 A1* | 11/2015 | Vranyes ................ G06F 16/21 707/695 |
| 2016/0155442 A1 | 6/2016 | Kannan et al. |
| 2016/0292204 A1* | 10/2016 | Klemm ............. G06F 16/3329 |
| 2017/0140174 A1* | 5/2017 | Lacey ............... G06Q 20/4016 |

* cited by examiner

FIG. 6
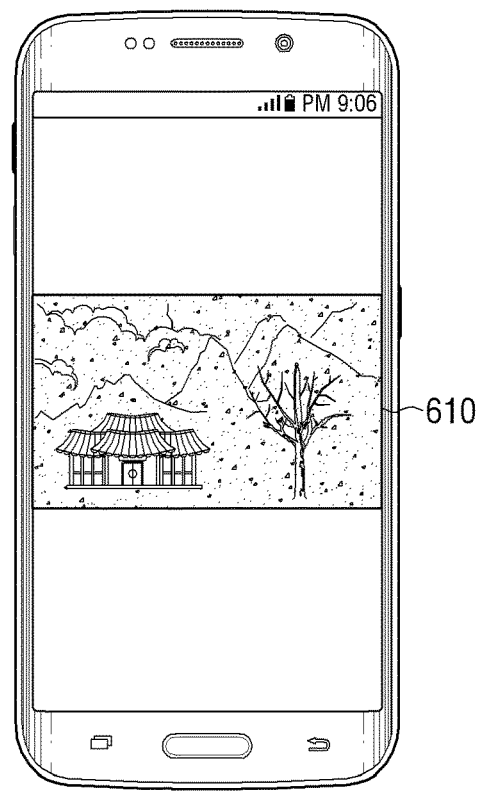
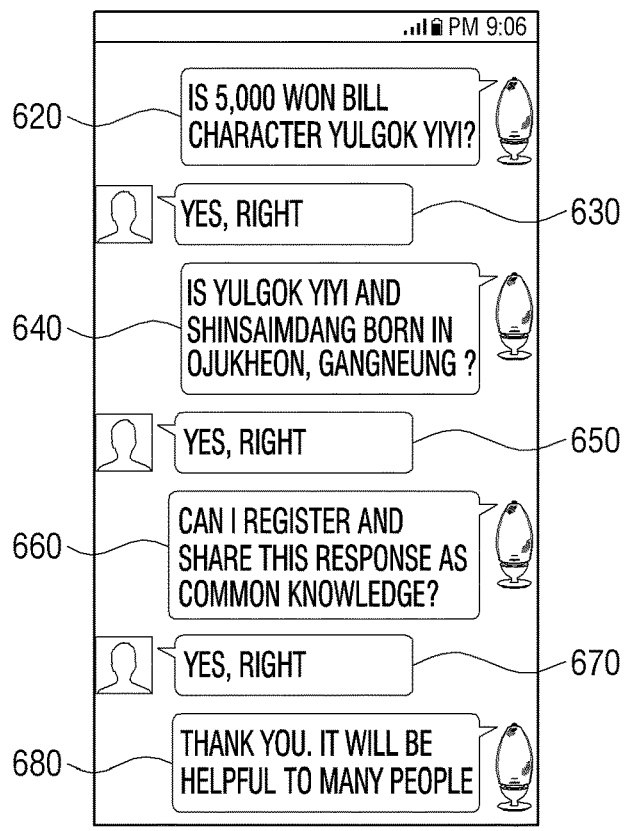

FIG. 9
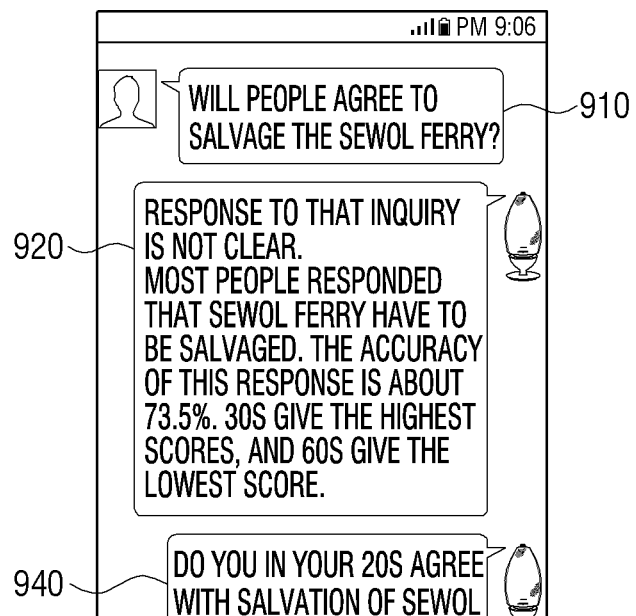
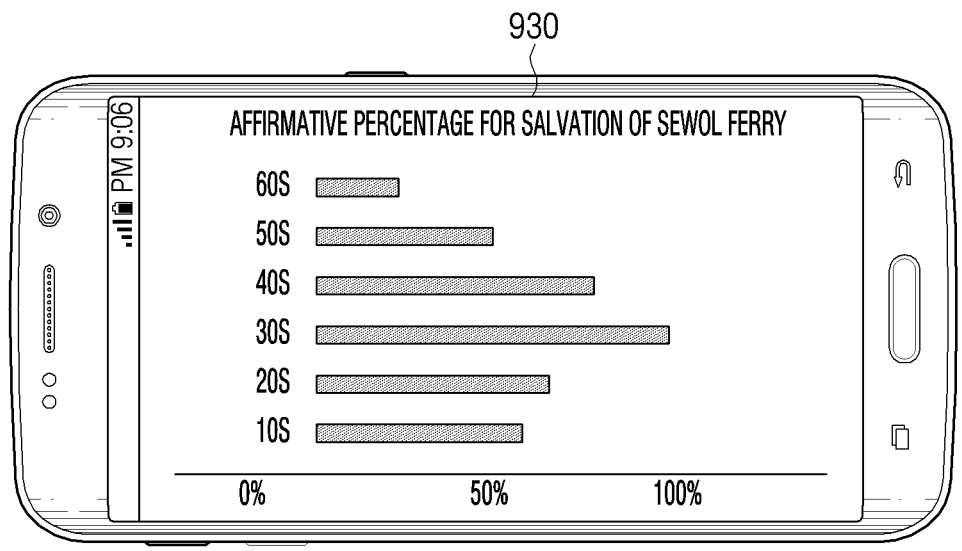

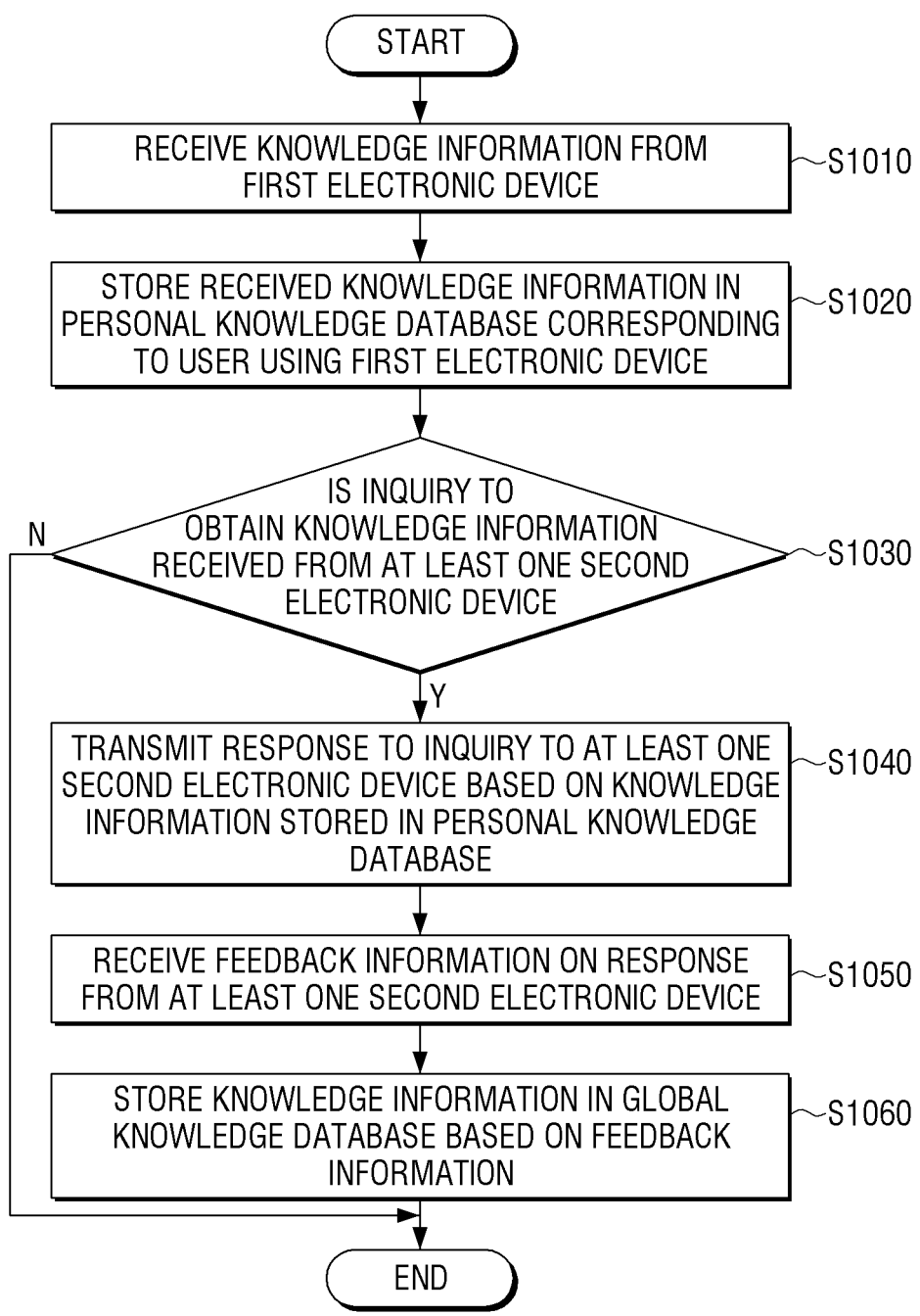

SERVER AND CONTROL METHOD THEREOF

CROSS-REFERENCE TO RELATED APPLICATIONS

This application is based on and claims priority under 35 U.S.C. § 119 to Korean Patent Application No. 10-2018-0096705, filed on Aug. 20, 2018, in the Korean Intellectual Property Office, and Korean Patent Application No. 10-2019-0099452, filed on Aug. 14, 2019, in the Korean Intellectual Property Office, the disclosures of which are incorporated by reference herein in their entireties.

BACKGROUND

Field

The disclosure relates to a server and a control method thereof, and for example, to a server providing a knowledge database to provide a response to a user inquiry and a control method thereof.

Description of Related Art

In recent years, an artificial intelligence system has been used in various fields. The artificial intelligence system is a system in which a machine performs learning and decision and becomes smart on one's own unlike an existing rule-based smart system. As the artificial intelligence system is used, a recognition rate is more improved and a user's taste may be more accurately understood, such that the existing rule-based smart system has been gradually replaced by a deep learning-based artificial intelligence system.

An artificial intelligence technology includes machine learning (for example, deep learning) and element technologies using the machine learning.

The machine learning may refer, for example, to an algorithm technology of classifying/learning features of input data on one's own, and the element technology is a technology of simulating functions such as recognition and decision of a human brain using a machine learning algorithm such as deep learning and includes technical fields such as linguistic understanding, visual understanding, inference/prediction, knowledge representation, and a motion control.

Various fields to which the artificial intelligence technology is applied may include the following. The linguistic understanding may refer, for example, to a technology of recognizing and applying/processing human languages/characters, and may include natural language processing, machine translation, a dialogue system, a response to an inquiry, speech recognition/synthesis, and the like. The visual understanding may refer, for example, to a technology of recognizing and processing things like human vision, and includes object recognition, object tracking, image search, human recognition, scene understanding, space understanding, image improvement, and the like. The inference/prediction may refer, for example, to a technology of determining and logically inferring and predicting information, and may include knowledge/probability-based inference, optimization prediction, preference-based planning, recommendation, and the like. The knowledge representation may refer, for example, to a technology of automating and processing human experience information as knowledge data, and may include knowledge construction (data generation/classification), knowledge management (data utilization), and the like. The motion control may refer, for example, to a technology of controlling self-driving of a vehicle and a motion of a robot, and includes a motion control (navigation, collision, driving), a manipulation control (behavior control), and the like.

In recent years, various services using artificial intelligence agents (for example, Assistant™, Alexa™, and the like) that provide a response to a user inquiry have been provided. The server providing the AI agent service stores a knowledge database to provide a response. However, in the conventional case, since a response is provided using a knowledge database including only limited knowledge information, there may be a limitation in providing only a limited response.

SUMMARY

Embodiments of the disclosure address the above disadvantages and other disadvantages not described above.

The disclosure provides a server capable of providing various types of replies to user inquiries using a personal knowledge database and a global knowledge database and a control method thereof.

According to an example embodiment of the disclosure, a control method of a server, may include: receiving knowledge information from a first electronic device; storing the received knowledge information in a personal knowledge database corresponding to a user using the first electronic device; transmitting a response to an inquiry to obtain the knowledge information to at least one second electronic device based on the knowledge information stored in the personal knowledge database, based on the inquiry being received from the at least one second electronic device; receiving feedback information to the response from the at least one second electronic device; and storing the knowledge information in a global knowledge database based on the feedback information.

According to another example embodiment of the disclosure, a server storing knowledge information, may include: a communication interface comprising communication interface circuitry; a memory configured to include at least one instruction; and a processor connected to the communication interface and the memory, wherein the processor executes the at least one instruction to control the server to receive knowledge information from a first electronic device through the communication interface, to store the received knowledge information in a personal knowledge database corresponding to a user using the first electronic device, to control the communication interface to transmit a response to an inquiry to obtain the knowledge information to at least one second electronic device based on the knowledge information stored in the personal knowledge database, based on the inquiry being received from the at least one second electronic device through the communication interface, to receive feedback information on the response from the at least one second electronic device through the communication interface, and to store the knowledge information in a global knowledge database based on the feedback information.

According to various example embodiments of the disclosure as described above, the server may provide various replies to user inquires, thereby providing various user experiences.

Additional and/or other aspects and advantages of the disclosure will be set forth in part in the description which follows and, in part, will be apparent from the description, or may be learned by practice of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 6 is a diagram illustrating an example method of storing knowledge information in a personal knowledge database of a server according to an embodiment of the disclosure;

FIGS. 8 and 9 are diagrams illustrating examples of providing a response to a user inquiry based on knowledge information according to an embodiment of the disclosure; and FIG. 10 is a flowchart illustrating an example method of controlling a server for managing knowledge information according to an embodiment of the disclosure.

DETAILED DESCRIPTION

Figure 1:
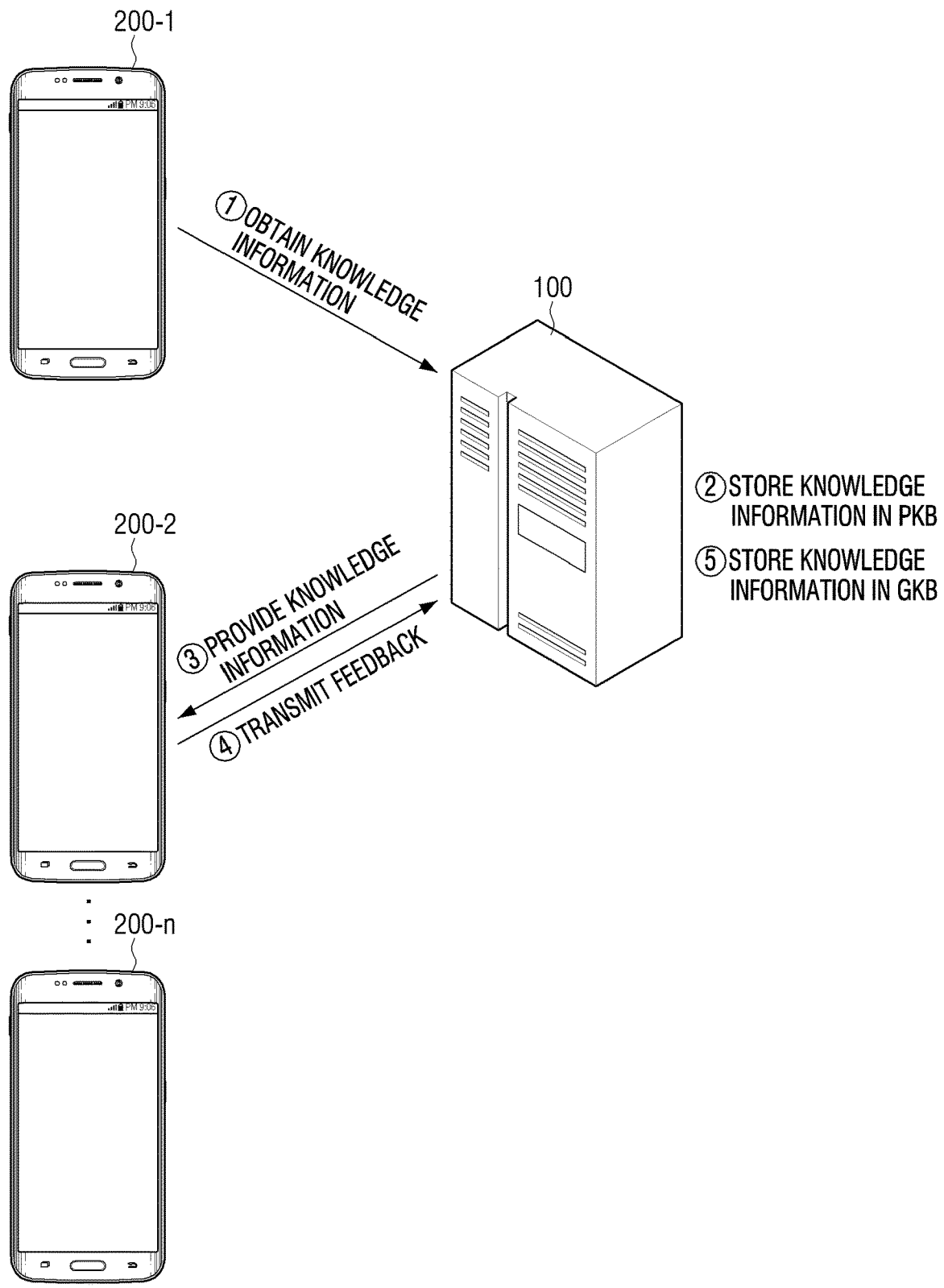
FIG. 1 is a diagram illustrating example use of an artificial intelligence agent system for managing knowledge information according to an embodiment of the disclosure.

Hereinafter, various example embodiments of the disclosure will be described in greater detail with reference to the accompanying drawings. However, it is to be understood that technologies mentioned in the disclosure are not limited to specific embodiments, but include all modifications, equivalents, and alternatives according to embodiments of the disclosure. Throughout the accompanying drawings, similar components will be denoted by similar reference numerals.

In the disclosure, an expression "have", "may have", "include", "may include", or the like, indicates existence of a corresponding feature (for example, a numerical value, a function, an operation, a component such as a part, or the like), and does not exclude existence of an additional feature.

In the disclosure, an expression "A or B", "at least one of A and/or B", "one or more of A and/or B", or the like, may include all possible combinations of items enumerated together. For example, "A or B", "at least one of A and B", or "at least one of A or B" may indicate all of 1) a case in which at least one A is included, 2) a case in which at least one B is included, or 3) a case in which both of at least one A and at least one B are included.

Expressions "first", "second", or the like, used in the disclosure may indicate various components regardless of a sequence and/or importance of the components, may be used in order to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled to another component or may be coupled to another component through another component (for example, a third component). On the other hand, when it is mentioned that any component (for example, a first component) is "directly coupled" or "directly connected" to another component (for example, a second component), it is to be understood that another component (for example, a third component) does not exist between any component and another component.

An expression "configured (or set) to" used in the disclosure may be used interchangeably with an expression such as "suitable for", "having the capacity to", "designed to", "adapted to", "made to", or "capable of" depending on a situation. A term "configured (or set) to" may not necessarily refer to "specifically designed to" in hardware. Instead, an expression "an apparatus configured to" may refer, for example, to a situation in which the apparatus may "do" together with other apparatuses or components. For example, a "sub-processor configured (or set) to perform A, B, and C" may refer, for example, to a dedicated processor (for example, an embedded processor) for performing the corresponding operations or a generic-purpose processor (for example, a central processing unit (CPU) or an application processor) that may perform the corresponding operations by executing one or more software programs stored in a memory device.

An electronic device according to various embodiments of the disclosure may include at least one of, for example, and without limitation, a smartphone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, a wearable device, or the like. The wearable device may include, for example, and without limitation, at least one of an accessory type wearable device (for example, a watch, a ring, a bracelet, an anklet, a necklace, a glasses, a contact lens, or a head-mounted-device (HMD), a textile or clothing integral type wearable device (for example, an electronic clothing), a body attachment type wearable device (for example, a skin pad or a tattoo), a living body implantation type circuit, or the like. In some embodiments, the electronic device may include, for example, and without limitation, at least one of, for example, a television (TV), a digital video disk (DVD) player, an audio player, a refrigerator, an air conditioner, a cleaner, an oven, a microwave oven, a washing machine, an air cleaner, a set-top box, a home automation control panel, a security control panel, a media box (for example, HomeSync™ of Samsung Electronics Co., Ltd, TV™ of Apple Inc, or TV™ of Google), a game console (for example, Xbox™, PlayStation™), an electronic dictionary, an electronic key, a camcorder, an electronic frame, or the like.

In other embodiments, an electronic device may, for example, and without limitation, include at least one of various medical devices (for example, various portable medical measuring devices (such as a blood glucose meter, a heart rate meter, a blood pressure meter, a body temperature meter, or the like), a magnetic resonance angiography (MRA), a magnetic resonance imaging (MRI), a computed tomography (CT), a photographing device, an ultrasonic device, or the like), a navigation device, a global navigation satellite system (GNSS), an event data recorder (EDR), a flight data recorder (FDR), an automobile infotainment device, a marine electronic equipment (for example, a marine navigation device, a gyro compass, or the like), avionics, a security device, an automobile head unit, an industrial or household robot, a drone, an automatic teller's machine (ATM) of a financial institute, a point of sales (POS) of a shop, Internet of things (IoT) devices (for example, a light bulb, various sensors, a sprinkler system, a fire alarm, a thermostat, a street light, a toaster, an exercise equipment, a hot water tank, a heater, a boiler, and the like), or the like.

In the disclosure, the term "user" may refer to a person using an electronic device or a device (for example, an artificial intelligence electronic device) using an electronic device.

Hereinafter, various example embodiments of the disclosure will be described in greater detail with reference to the accompanying drawings.

FIG. 1 is a diagram illustrating an example use of an artificial intelligence agent system for managing knowledge information according to an embodiment of the disclosure. As illustrated in FIG. 1, an artificial intelligence agent system 10 may include a server 100 and a plurality of electronic devices 200-1, 200-2, . . . , 200-n.

The server 100 may obtain knowledge information from the first electronic device 200-1. In this example, the server 100 may inquire about specific knowledge through an artificial intelligence agent program included in the server 100, and obtain the knowledge information by allowing of the first electronic device 200-1 to provide a response to a user inquiry. In addition, the server 100 may obtain the knowledge information input through the user. In this example, the server 100 may obtain information (for example, ID information) on the user of the first electronic device 200-1 together with the knowledge information.

For example, prior to storing the knowledge information, the server 100 may determine whether the knowledge information obtained from the first electronic device 200-1 includes, for example, antisocial information, personal information, fake information, etc. If the knowledge information obtained from the first electronic device 200-1 includes the antisocial information, the personal information, or the fake information, the server 100 may filter the knowledge information in a personal knowledge database.

The server 100 may store the knowledge information obtained from the first electronic device 200-1 in a first knowledge database (e.g., a personal knowledge database (which may hereinafter be referred to as PKB)). The PKB may be a knowledge database corresponding to the user of the first electronic device 200-1. In this example, the server 100 may store the knowledge information in an ontology form including relations of words or sentences constituting the knowledge information. The server 100 may store the knowledge information in a dataset form (inquiry and response).

The server 100 may provide the knowledge information to the second electronic device 200-2. For example, if the user inquiry to obtain the knowledge information is received from the second electronic device 200-2, the server 100 may provide the response to a user inquiry to the second electronic device 200-2 based on the knowledge information stored in the PKB. In this example, the response to the inquiry may include at least one of information indicating that the response is a personal opinion and information indicating that the response may be a fake. In addition, the server 100 may transmit the knowledge information to the second electronic device 200-2 before the user inquiry is received from the second electronic device 200-2.

The second electronic device 200-2 may transmit feedback information on the knowledge information received from the server 100 to the server 100. For example, the second electronic device 200-2 may transmit feedback information on whether the knowledge information received from the server 100 is true. In addition, the second electronic device 200-2 may transmit feedback information including a subjective opinion on the knowledge information received from the server 100.

The server 100 may store the knowledge information based on the feedback information in a second knowledge database (or global knowledge database (which may hereinafter be referred to as GKB)). For example, if the feedback information indicating that the response to the inquiry is "true" received from at least one second electronic device 200-2 is equal to or greater than a first threshold value, the server 100 may store the knowledge information in the GKB. However, if the feedback information indicating that the response to the inquiry is "true" received from at least one second electronic device 200-2 is less than a second threshold value, the server 100 may filter the knowledge information in the PKB.

In addition, the GKB may exist in each of a plurality of user groups. In this example, the plurality of user groups may include, for example, and without limitation, an age group, a region group, a gender group, a political disposition group, and the like. For example, the server 100 may store the knowledge information in a GKB corresponding to a user group to which a user using the first electronic device 200-1 and a user using the second electronic device 200-2 belong.

If an inquiry to obtain the knowledge information is received from a third electronic device after the knowledge information is stored in the GKB, the server 100 may transmit a response to an inquiry based on the knowledge information and the feedback information stored in the GKB. In this case, the server 100 may provide the response to the inquiry in a definite expression or through an expression indicating that information is authorized from a plurality of users. The server 100 may transmit to the third electronic device the information on the probability that the response is true together with the response to the inquiry.

If an inquiry to obtain knowledge information is received from a fourth electronic device used by another user belonging to a user group corresponding to the GKB, the server 100 may transmit to the fourth electronic device the response to the inquiry based on the knowledge information stored in the GKB corresponding to the user group.

As described above, the server 100 and the plurality of electronic devices 200-1, 200-2, . . . , 200-n may manage the knowledge information in various knowledge databases, and use a personal assistant program which is an artificial intelligence dedicated program (or artificial intelligence agent) in order to provide the knowledge information. In this example, the personal assistant program, which may refer, for example, to a dedicated program for providing an artificial intelligence (AI) based service, may be executed, for example, and without limitation, by a generic-purpose processor (for example, a central processing unit (CPU)), a separate AI dedicated processor (for example, a graphics processing unit (GPU)), or the like.

For example, if a preset user input (for example, a user's voice including a preset word, or the like) is input or a button (for example, a button for executing an AI agent) provided on the electronic device 200 is pressed, the AI agent may operate (or run). The AI agent may provide a response to a user inquiry based on the knowledge information stored in the server 100.

If the preset user input (for example, user's voice including a preset word, or the like) is input or the button (for example, the button for executing an AI agent) provided on the electronic device 200 is pressed, the AI agent may operate. If the preset user input (for example, user's voice including a preset word, or the like) is input or a button (for example, a button for executing an AI agent) provided on the electronic device 200 is pressed, the AI agent may be in an already executed state. In this example, after the predetermined user input (for example, the user's voice including the preset word, and the like) is input or a button (for example, the button for executing the AI agent) provided on the electronic device 200 is pressed, the AI agent of the electronic device 200 may provide the response to the user inquiry based on the knowledge information stored in the server 100. In addition, before the preset user input (for example, the user's voice including the preset word, or the like) is input or a button (for example, the button for executing the AI agent) provided on the electronic device 200 is pressed, the AI agent may be in a standby state. For example, the standby state is a state in which the preset user input is received to control the start of the operation of the artificial intelligence agent. If the preset user input (for example, the user's voice including the preset word, and the like) is input while the AI agent is in the standby state or the button (for example, the button for executing the AI agent) provided on the electronic device 200 is pressed, the electronic device 200 may operate the AI agent and provide the response to the user inquiry based on the knowledge information stored in the server 100.

The example embodiment described above describes that the knowledge database storing the knowledge information is stored in the server 100, but is merely an example, and the disclosure is not limited thereto. For example, the PKB of the knowledge database may be stored in the electronic device 200, and the GKB may be stored in the server 200.

Figure 2:
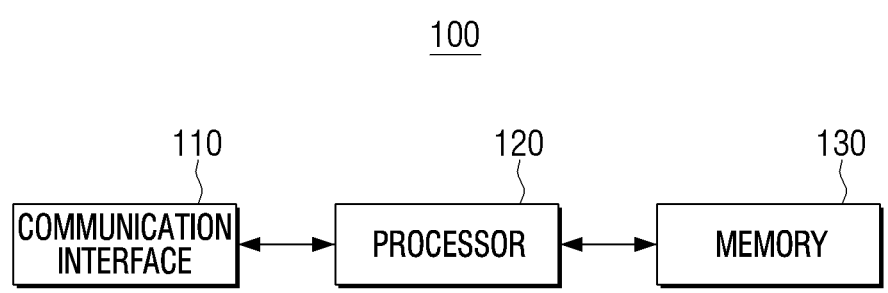
FIG. 2 is a block diagram illustrating example components of an example server according to an embodiment of the disclosure.

FIG. 2 is a block diagram illustrating example components of an example server according to an embodiment of the disclosure.

As illustrated in FIG. 2, the server 100 may include a communication interface (e.g., including communication interface circuitry) 110, a processor (e.g., including processing circuitry) 120, and a memory 130. The components illustrated in FIG. 2 are examples for implementing various example embodiments of the disclosure, and appropriate hardware/software configurations that may be apparent to those skilled in the art may be additionally included in the server 100 or various components illustrated in FIG. 2 may be omitted.

The communication interface 110 may include various communication interface circuitry and communicate with an external electronic device through various communication schemes. For example, the communication interface 110 may receive knowledge information from the external electronic device 200. In addition, the communication interface 110 may provide the knowledge information as a response to an inquiry received from the external electronic device 200. In addition, the communication interface 110 may receive feedback information on a response provided based on the knowledge information from the external electronic device 200.

The memory 130 may store instructions and/or data related to at least one other component of the server 100. For example, the memory 130 may be implemented by a non-volatile memory, a volatile memory, a flash memory, a hard disk drive (HDD), a solid state drive (SDD), or the like. The memory 130 may be accessed by the processor 120, and the processor 120 may perform readout, recording, correction, deletion, update, and the like, of data. In the disclosure, the term 'memory' may include the memory 130, a ROM (not illustrated) or a RAM (not illustrated) in the processor 120, or a memory card (not illustrated) (for example, a micro secure digital (SD) card or a memory stick) mounted in the server 100.

For example, the memory 130 may store an artificial intelligence dedicated program. In this example, the AI dedicated program may be a personalized program for providing various services for the specific electronic device 200.

Figure 3:
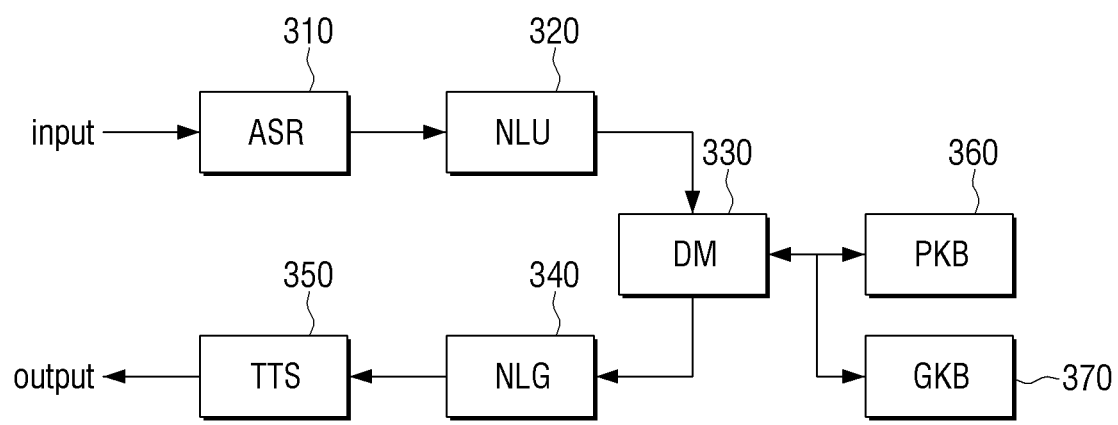
FIG. 3 is a block diagram illustrating an example dialogue system of an artificial intelligence agent system according to an embodiment of the disclosure.

In addition, the memory 130 may store a dialogue system that provides a response to user input (in particular, user's utterance). As illustrated in FIG. 3, the dialogue system may include automatic speech recognition (ASR) unit (e.g., including processing circuitry and/or executable program elements) 310, natural language understanding (NLU) unit (e.g., including processing circuitry and/or executable program elements) 320, a dialogue manager (DM) (e.g., including processing circuitry and/or executable program elements) 330, a natural language generator (NLG) (e.g., including processing circuitry and/or executable program elements) 340, a text-to-speech (TTS) (e.g., including processing circuitry and/or executable program elements) 350, a personal knowledge database (PKB) 360, and a global knowledge database (GKB) 460.

The automatic speech recognition unit 310 may include various processing circuitry and/or executable program elements and may convert a user's utterance into a text form that the server 100 can process by performing speech recognition on the user's utterance input through a microphone or the like of an external device. The automatic speech recognition unit 310 may include a language model for correcting conversion errors, unique user's utterance, utterance errors, and the like.

The natural language understanding unit 320 may include various processing circuitry and/or executable program elements and may be configured to identify a task related to an entity and an intent of the user's utterance based on a speech recognition result. For example, the natural language understanding unit 320 may interpret a sentence by analyzing a structure of a sentence and main components, and may perform sentence analysis using statistics/analysis and the like.

The dialogue manager 330 may include various processing circuitry and/or executable program elements and may be configured to obtain information on the response to a user's utterance based on a natural language understanding result and data (e.g., knowledge information) stored in the PKB 360 or the GKB 370. The dialogue manager 330 may be implemented based on a frame, an agent, or the like, and may also be implemented through a Markov decision process (MDP), reinforcement learning based modeling. In this example, the dialogue manager 330 may obtain information for generating a response. As described above, the obtained information may be determined based on a task identified through the natural language understanding unit 320 and the data stored in the PKB 360 or the GKB 370.

The natural language generator 340 may include various processing circuitry and/or executable program elements and obtain a natural language as the response to the user's utterance based on the information obtained through the dialogue manager 330. For example, the natural language generator 340 may input the information obtained through the dialogue manager 330, the GKB 370, and the PKB 360 as an input value of an artificial intelligence model to obtain the natural language as the response to the user's utterance.

The TTS 350 may include various processing circuitry and/or executable program elements and convert the obtained natural language into a voice. As a result, the dialogue system may provide the response to the user's utterance as a voice, so the user may dialogue with the electronic device 200.

The PKB 360 and the GKB 370 may, for example, include components for storing information necessary for generating a response in the dialogue manager 330. In this example, the PKB 360 may be a database that stores the knowledge information obtained by the user of the corresponding electronic device 200. For example, the PKB 360 may be provided for each user of the electronic device 200. The GKB 370 may be a database that stores knowledge information authenticated by a plurality of users. In this example, the GKB 370 may be provided for each user group. For example, the GKB 370 may be provided for various user groups such as age, gender, region, and political disposition.

In this example, the knowledge information stored in the PKB 360 and the GKB 370 may be configured in an ontology form including association information on the user inquiry and the response included in the knowledge information. The knowledge information may be stored in a form of a data set (for example, inquiry and response) that matches and stores the user inquiry and the response to the inquiry.

The PKB 360 may store past user utterance history. In detail, the PKB 360 may store history information related to the past user utterances, the response to the utterance, and re-utterance of a response. The manner in which the history information is stored may vary.

The dialogue manager 330 may search for the knowledge information in the GKB 370 and the PKB 360 to obtain the response to the user inquiry. The dialogue manager 330 searches for the knowledge information for providing the response to the user inquiry from the GKB 370, and if the knowledge information for providing the response to the GKB 370 does not exist, the PKB 360 may search for the knowledge information for providing the response to the user inquiry. The dialogue manager 330 may search the GKB 370 and the PKB 360 simultaneously to search for knowledge information for providing an optimal response to a user inquiry.

In addition, according to an embodiment of the disclosure, the memory 130 may store the artificial intelligence model learned to generate (or obtain) the natural language. In the disclosure, the learned AI model may be constructed in consideration of an application field of a recognition model, computer performance of a device, or the like. For example, the AI model may be learned to obtain the natural language using the information obtained from the dialogue manager 330 and the knowledge databases 360 and 370 as input data. The learned AI model may be, for example, a model based on a neural network to generate the natural language. The AI model may be designed to simulate a human brain structure on a computer, and may include a plurality of network nodes simulating neurons of a human neutral network and having weights. The plurality of network nodes may form a connection relationship to simulate synaptic activity of neurons transmitting and receiving signals through synapses. In addition, an AI model may include, for example, a neutral network model or a deep learning model developed from the neutral network model. In the deep learning model, the plurality of network nodes may be positioned at different depths (or layers), and may transmit and receive data therebetween depending on a convolution connection relationship. An example of the learned AI model may include a deep neural network (DNN), a recurrent neural network (RNN), a bidirectional recurrent deep neural network (BRDNN), and the like, but is not limited thereto.

The above-described example embodiment describes that the components of the dialogue system is included in the server 100, but is merely an example, and the rest components other than the GKB 370 among the components of the dialogue system may be included in the electronic device 200. For example, the electronic device 200 may implement the dialogue system in an on-device form.

Referring back to FIG. 2, the processor 120 may be electrically connected to the memory 130 and may include various processing circuitry to control the overall operations and functions of the server 100. For example, the processor 120 may receive the knowledge information from the first electronic device 200-1 through the communication interface 110 by executing at least one instruction stored in the memory 130, and store the received knowledge information in the PGB 360 corresponding to the user using the first electronic device 200-1. If the inquiry to obtain the knowledge information is received from at least one second electronic device 200-2 through the communication interface 110, the processor 120 may control the communication interface 110 based on the knowledge information stored in the PKB 360 to transmit the response to the inquiry to at least one second electronic device 200-2. The processor 120 may receive the feedback information on the response from at least one second electronic device 200-2 through the communication interface 110, and store the knowledge information in the GKB 370 based on the feedback information.

For example, if the feedback information indicating that the response to the inquiry is true is greater than or equal to the first threshold value (for example, 70%), the processor 120 may store the knowledge information in the GKB 370, and if the feedback information indicating that the response to the inquiry is true is less than the second threshold value (for example, 50%), the processor 120 may filter the knowledge information stored in the PKB 360. If, for example, it is determined that the response to the inquiry is fake information, the processor 120 may control the communication interface 110 to transmit a guide message guiding that the knowledge information is the fake information to the first electronic device 200-1.

For example, the processor 120 may provide different responses depending on a type of database from which the knowledge information is searched. For example, if the knowledge information is obtained from the PKB 360, the processor 120 may provide a response to an inquiry including at least one of information indicating that the response is a personal opinion and information indicating that the response may be fake. If the knowledge information is obtained from the GKB 370, the processor 120 may provide the response to the inquiry in a definite expression or through an expression indicating that information is authorized from a plurality of users. The processor 120 may provide the response to the inquiry that includes the information on the probability that the response is true. The processor 120 may provide the response to the inquiry including information on a user group corresponding to the knowledge database in which the knowledge information is searched.

In addition, if the GKB 370 exists in each of a plurality of user groups, the processor 120 may store the knowledge information to the GKB corresponding to the user group to which a first user using the first electronic device 200-1 and a second user using the second electronic device 200-2 transmitting the feedback information commonly belongs. For example, when both the first user and the second user are in 30s, the processor 120 may store the knowledge information in the GKB corresponding to 30s.

If the inquiry to obtain the knowledge information is received from the third electronic device through the communication interface 110, the processor 120 may control the communication interface 110 to first search for the knowledge information from the GKB corresponding to the third electronic device and transmit the response to the inquiry to the third electronic device based on the knowledge information searched in the GKB. For example, if the user age of the third electronic device is 30s, the processor 120 may first search for the knowledge information in the GKB corresponding to 30s and provide the response to the user inquiry.

When the knowledge information is authenticated from the plurality of user groups, the processor 120 may store the knowledge information in the GKB corresponding to the plurality of user groups. For example, if knowledge information is authenticated from "user group of 10s" and "user group of 20s", the processor 120 may store the knowledge information in the GKB for "user groups of 10s and 20s".

Figure 4:
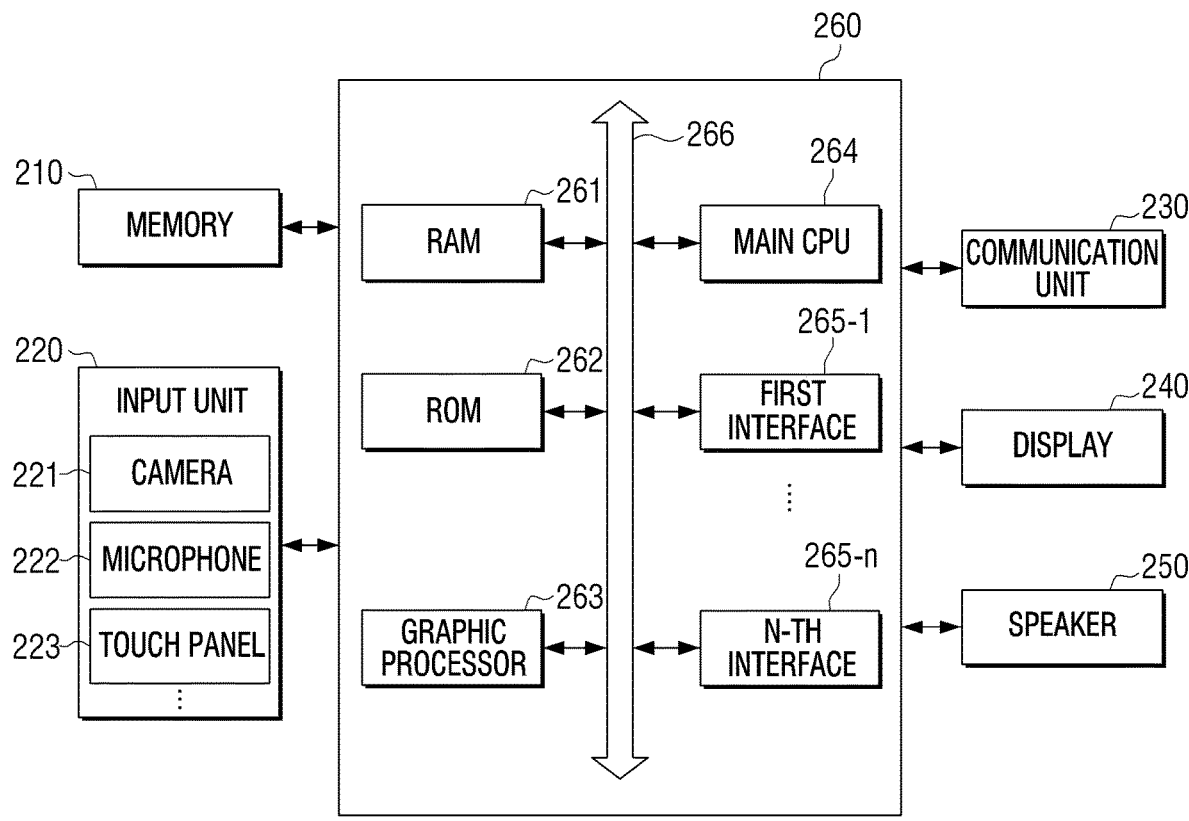
FIG. 4 is a block diagram illustrating example components of an example electronic device according to an embodiment of the disclosure.

FIG. 4 is a block diagram illustrating example components of an example electronic device according to an embodiment of the disclosure. The electronic device 200 may further include a memory 210, an input unit (e.g., including input circuitry) 220, a communication unit (e.g., including communication circuitry) 230, a display 240, a speaker 250, and a processor (e.g., including processing circuitry) 260. However, the disclosure is not limited to the above-described configuration, and some components may be added or omitted as necessary.

The memory 210 may store instructions and/or data associated with at least one other component of the electronic device 200. For example, the memory 210 may be implemented by a non-volatile memory, a volatile memory, a flash memory, a hard disk drive (HDD), a solid state drive (SDD) or the like. The memory 210 may be accessed by the processor 260, and the processor 260 may perform readout, recording, correction, deletion, update, and the like, of data. In the disclosure, the term 'memory' may include the memory 210, a read only memory (ROM) (not illustrated) and a random access memory (RAM) (not illustrated) in the processor 260, or a memory card (not illustrated) (for example, a micro secure digital (SD) card or a memory stick) mounted in the electronic device 200. In addition, the memory 210 may store programs and data for configuring various screens to be displayed on a display area of the display 240.

In addition, the memory 210 may store an AI agent for operating the dialogue system. For example, the electronic device 200 may use an artificial intelligence agent to generate natural language as a response to a user's utterance. In this example, the artificial intelligence agent, which may be a dedicated program for providing an artificial intelligence (AI) based service (for example, a speech recognition service, a secretary service, a translation service, a search service, or the like), may be executed by, for example, an existing generic-purpose processor (for example, a central processing unit (CPU)) or a separate AI dedicated processor (for example, a graphics processing unit (GPU), or the like).

The input unit 220 may include various input circuitry and may be configured to receive a user instruction or various data. In this example, the input unit 220 may include, for example, and without limitation, a camera 221, a microphone 222, a touch panel 223 and the like.

The camera 221 may be configured to obtain image data around the electronic device 200. The camera 221 may photograph a still image or a moving image. For example, the camera 221 may include one or more image sensors (for example, a front sensor or a rear sensor), a lens, an image signal processor (ISP), or a flash (for example, an LED, an xenon lamp or the like). The microphone 222 may be configured to obtain sound around the electronic device 200. The microphone 222 may receive an external sound signal and generate electrical voice information. The microphone 222 may use various noise removing algorithms for removing noise generated while receiving the external sound signal. For example, the microphone 222 may obtain the user's voice for obtaining the knowledge information.

The touch panel 223 may be configured to receive various user touch inputs. For example, the touch panel 223 may be configured as a touch display in combination with a display to be displayed below.

The input unit 220 may have various configurations for receiving various data in addition to the camera 221, the microphone 222, and the touch panel 223 described above.

The communication unit 230 may include various communication interface circuitry and may be configured to communicate with external device. The communication connection of the external device with the communication unit 230 may be performed through a third device (for example, a repeater, a hub, an access point, a server a gateway or the like). The wireless communication may include cellular communication using at least one of, for example, LTE, LTE advance (LTE-A), code division multiple access (CDMA), wideband CDMA (WCDMA), universal mobile telecommunications system (UMTS), wireless broadband (WiBro), and global system for mobile communications (GSM). According to an embodiment, the wireless communication may include at least one of, for example, wireless fidelity (WiFi), Bluetooth, Bluetooth low power (BLE), Zigbee, near field communication (NFC), magnetic secure transmission, radio frequency (RF), and a body area network (BAN). The wired communication may include at least one of, for example, universal serial bus (USB), high definition multimedia interface (HDMI), recommended standard 232 (RS-232), power line communication, and plain old telephone service (POTS). The network in which the wireless or wired communication is performed may include a telecommunications network, for example, at least one of a computer network (for example, LAN or WAN), the Internet, or a telephone network.

For example, the communication unit 230 may communicate with an external server to provide an artificial intelligence agent service.

The display 240 is configured to output various images. In particular, the display 240 may provide a response to a user inquiry in various UI forms. The display 240 for providing various images may be implemented by various types of display panels.

The speaker 250 is configured to output various notification sounds or voice messages as well as output various audio data which are subjected to various processing operations, such as decoding, amplification, and noise filtering, by the audio processing unit. On the other hand, the configuration for outputting audio may be implemented as a speaker, which is merely an example, and may be implemented as an output terminal which may output audio data.

As described above, the processor 260 may include various processing circuitry and may control an overall operation of the electronic device 200. The processor 260 includes a RAM 261, a ROM 262, a main CPU 264, a graphic processor 263, first to n-th interfaces 265-1 to 265-n, and a bus 266. The RAM 261, the ROM 262, the main CPU 264, the graphic processor 263, the first to n-th interfaces 265-1 to 266-n, and the like, may be connected to each other through the bus 266.

An instruction set for booting a system, or the like, may be stored in the ROM 262. When a turn-on command is input to supply power, the main CPU 264 may copy an operating system (O/S) stored in the memory 210 to the RAM 261 depending on an instruction stored in the ROM 261, and execute the O/S to boot the system. When the booting is completed, the main CPU 264 copies various application programs stored in the memory to the RAM 261, executes the application programs copied to the RAM 261, and performs various operations.

For example, the main CPU 264 accesses the memory 210 to perform booting using an operating system (O/S) stored in the memory 210. The main CPU 264 performs various operations using various programs, contents, data, and the like, stored in the memory 210.

The first to n-th interfaces 265-1 to 265-n are connected to various components described above. One of the interfaces may be a network interface connected to an external device through a network.

For example, the processor 260 may control the overall operation of the electronic device 200 based on at least one instruction stored in the memory.

For example, the processor 260 may store the knowledge information in the knowledge database of the server 100 by transmitting the knowledge information to the server 100 through the communication interface 210. For example, the processor 260 may control the communication interface 210 to transmit to the server 100 a request for registering knowledge information in the server 100 by a user input. In this case, if an inquiry message inquiring whether to store knowledge information in a PKB corresponding to a user who uses the electronic device 200 is received from the server 100, the processor 260 may control the display 240 to display the inquiry message. If the user input requesting to store the knowledge information in the PKB 360 is received through the input unit 220, the processor 260 may control the communication interface 210 to transmit a confirmation message for storing the knowledge information in the PKB 360 in response to the inquiry message. In another example embodiment, the processor 260 may receive the inquiry message inquiring whether to register the knowledge information in the PKB 360 based on information (for example, SNS information, payment information, location information and the like) directly associated with the user from the server 100 through the communication interface 210. If the user input requesting to store the knowledge information in the PKB 360 is received through the input unit 220, the processor 260 may control the communication interface 210 to transmit a confirmation message for storing the knowledge information in the PKB 360.

In addition, the processor 260 may receive the user inquiry to obtain the knowledge information through the input unit 220. The processor 260 may control the communication interface 210 to transmit the obtained user inquiry to the external server 100. In addition, the processor 260 may receive the response to the user inquiry obtained based on the knowledge information from the external server 100 through the communication interface 210. In this case, the processor 260 may provide the response to the user inquiry through the display 240 and may output the response to the user inquiry through the speaker 250.

Hereinafter, various example embodiments of the disclosure will be described further with reference to the accompanying drawings.

Figure 5:
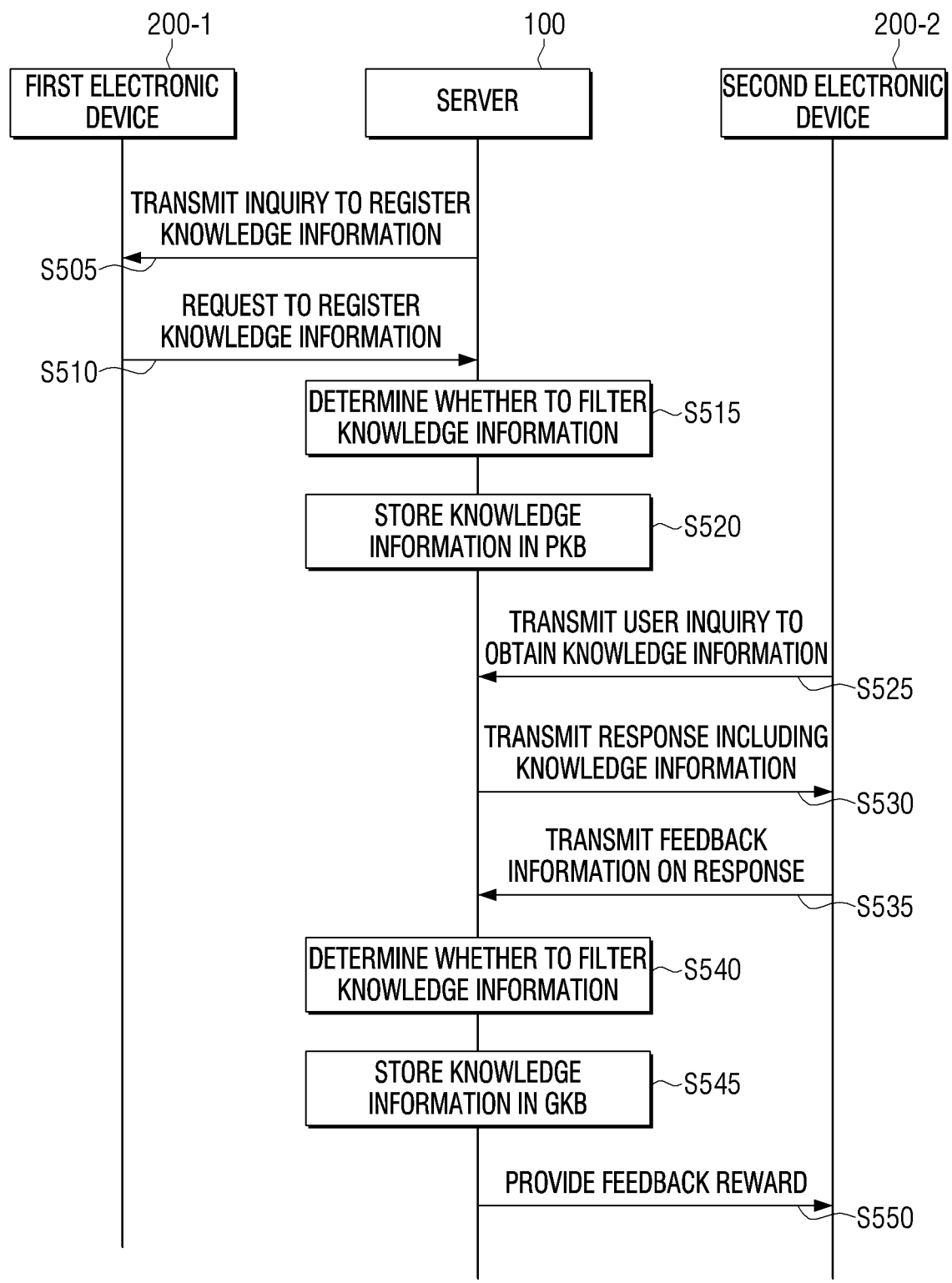
FIG. 5 is a sequence diagram illustrating an example method of managing knowledge information of an artificial intelligence agent system according to an embodiment of the disclosure.

FIG. 5 is a sequence diagram illustrating an example method of managing knowledge information of an artificial intelligence agent system according to an embodiment of the disclosure.

The server 100 may transmit an inquiry to register knowledge information to the first electronic device 200-1 (S505). For example, as illustrated in FIG. 6, when a user of the first electronic device 200-1 uploads a photograph of Ojukheon 610 on SNS, the server 100 may sequentially provide a first knowledge inquiry 620 "Is 5,000 won bill character Yulgok YiYi?" and a second knowledge inquiry 640 "Is Yulgok YiYi and Shinsaimdang born in Ojukheon, Gangneung?". In this example, the first electronic device 200-1 may sequentially transmit responses 630 and 650 to knowledge inquiry "yes, right" through a user input. In addition, the server 100 may provide an inquiry message 660, "Can I register and share this response as common knowledge?" in order to inquire whether the knowledge information obtained through the knowledge inquiry may be registered and shared.

Referring back to FIG. 5, the first electronic device 200-1 may transmit the registration request for knowledge information (S510). For example, as illustrated in FIG. 6, the first electronic device 200-1 may provide the server 100 with a confirmation message 670 "yes, right" through the user input in response to the inquiry message 660. In this example, the server 100 may provide a message 680 "Thank you. It will be helpful to many people." to the first electronic device 200-1.

As illustrated in FIG. 6, the server 100 may first provide the inquiry message for registering the knowledge information, and providing the confirmation message for the inquiry message by a user is merely an example, and a user may first request to register the knowledge information in the server 100. For example, the first electronic device 200-1 may transmit the registration request for the knowledge information, "A place where Yulgok YiYi and Shinsaimdang was born in Ojukheon, Gangneung. Register it as common knowledge" through the user input.

The server 100 may determine whether the knowledge information is to be filtered (S515). For example, the server 100 may determine whether the knowledge information includes antisocial information (for example, swearing, lewd, violence, murder, drugs, and the like), whether the knowledge information includes personal information, and whether the knowledge information is fake information to determine whether the knowledge information is filtered.

The server 100 may store the knowledge information in the PKB 360 (S520). For example, when the knowledge information is not filtered, the server 100 may store the knowledge information in the PKB 360 corresponding to the user of the first electronic device 200-1. In this example, the knowledge information may be stored in an ontology form, but this is merely an example and the knowledge information may be stored in a data set form.

The second electronic device 200-2 may transmit the user inquiry to obtain the knowledge information to the server 100 (S525). For example, the second electronic device 200-2 may transmit a user inquiry "Where was Yulgok YiYi born?" to the server 100.

The server 100 may transmit the response including the knowledge information to the second electronic device 200-2 in response to the user inquiry (S530). In detail, the server 100 may provide the response to the user inquiry based on the knowledge information included in the knowledge database in the server 100. For example, the server 100 may provide a response "A place where Yulgok Yi was born is Ojukheon, Gangneung" as the response to the user inquiry based on the knowledge information stored in the PKB 360. In this example, the response to the user inquiry may be provided as the natural language form through the dialogue system as illustrated in FIG. 3.

Figure 7:
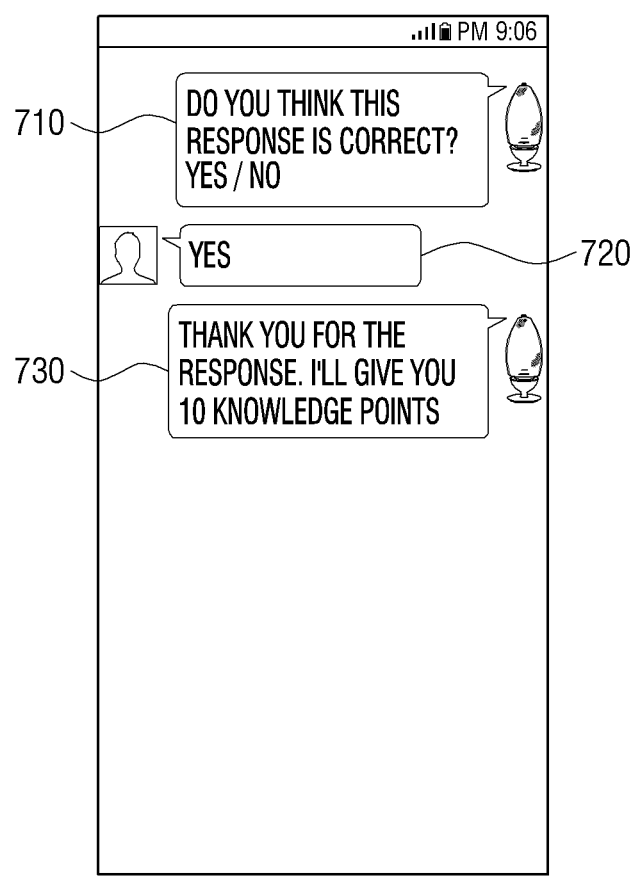
FIG. 7 is a diagram illustrating an example process of obtaining feedback information according to an embodiment of the disclosure.

The second electronic device 200-2 may transmit feedback information on the response to the server 100 (S535). In an embodiment, as illustrated in FIG. 7, the server 100 may transmit a message 710 inquiring whether the knowledge information is true to the second electronic device 200-2. The second electronic device 200-2 may provide the server 100 with feedback information 720 "yes" by the user input. In another embodiment, the server 100 may transmit a message for inquiring whether the knowledge information is antisocial information or information including slang to the second electronic device 200-2.

The server 100 may determine whether the knowledge information is filtered (S540). For example, the server 100 may determine whether the current knowledge information is the antisocial information based on the feedback information and whether the knowledge information includes slang or swearing.

If the knowledge information is not filtered, the server 100 may store the knowledge information in the GKB 370 (S545). For example, the server 100 may store the knowledge information in the GKB 370 based on the feedback information. For example, when the "feedback information indicating that the response to the inquiry is true" received from another electronic device including the second electronic device 200-2 is equal to or greater than the first threshold value, the server 100 may store the knowledge information in the GKB 370. When the "feedback information indicating that the response to the inquiry is true" received from another electronic device including the second electronic device 200-2 is less than the second threshold value, the server 100 may filter the knowledge information in the GKB 370. In this example, the GKB 370 may be a knowledge database in which the knowledge information authenticated by all users is stored, but this is merely an example and may be a knowledge database corresponding to a user group commonly including the first user using the first electronic device 200-1 and the second user using the second electronic device 200-2. In this example, the knowledge information stored in the GKB 370 may be stored together with the information on the probability that the knowledge information is true (that is, the percentage of the electronic devices that transmit the feedback information "the knowledge information is true" among the plurality of electronic devices.

The server 100 may provide a feedback reward in response to the feedback information (S550). For example, as illustrated in FIG. 7, the server 100 may provide a feedback reward 730 "Thank you for an answer. I'll give you 10 knowledge points". In this example, the server 100 may provide various feedback rewards such as, for example, and without limitation, an item, money, currency, or the like, in addition to the points.

The server 100 may store the knowledge information in the PKB 360 or the GKB 370 through the operation as described above. For example, the server 100 may provide different responses according to a type of database in which the knowledge information is searched in order to provide the response to the user inquiry. For example, if the knowledge information is obtained from the PKB 360, the processor 120 may provide a response to an inquiry including at least one of information indicating that the response is a personal opinion and information indicating that the response may be fake. For example, if the knowledge information is searched in the PKB 360 to provide the response to the user inquiry "Where Yulgok Yi was born?", the server 100 may provide a response as the expression "Someone said that Yulgok YiYi was born in Ojukheon, Gangneung" or the expression "Yulgok YiYi was born in Ojukhun, Gangneung, which may not be true. Please check again".

If the knowledge information is obtained from the GKB 370, the server 100 may provide the response to the inquiry in a definite expression or through an expression indicating that information is authorized from a plurality of users. For example, if the knowledge information is searched in the GKB 370 to provide the response to the user inquiry "Where Yulgok Yi was born?", the server 100 may provide a response as the definitive expression "Yulgok YiYi was born in Ojukheon, Gangneung" or the expression "Most people said that Yulgok YiYi was born in Ojukhun, Gangneung". The server 100 may provide the response to the inquiry that includes the information on the probability that the response is true. For example, the server 100 may provide a response as the expression "80% of people said that Yulgok YiYi was born in Ojukheon, Gangneung". The server 100 may provide the response to the inquiry including information on a user group corresponding to the knowledge database in which the knowledge information is searched. For example, the server 100 may provide a response as the expression "Teenage students said that Yulgok YiYi was born in Ojukheon, Gangneung".

Figure 8:
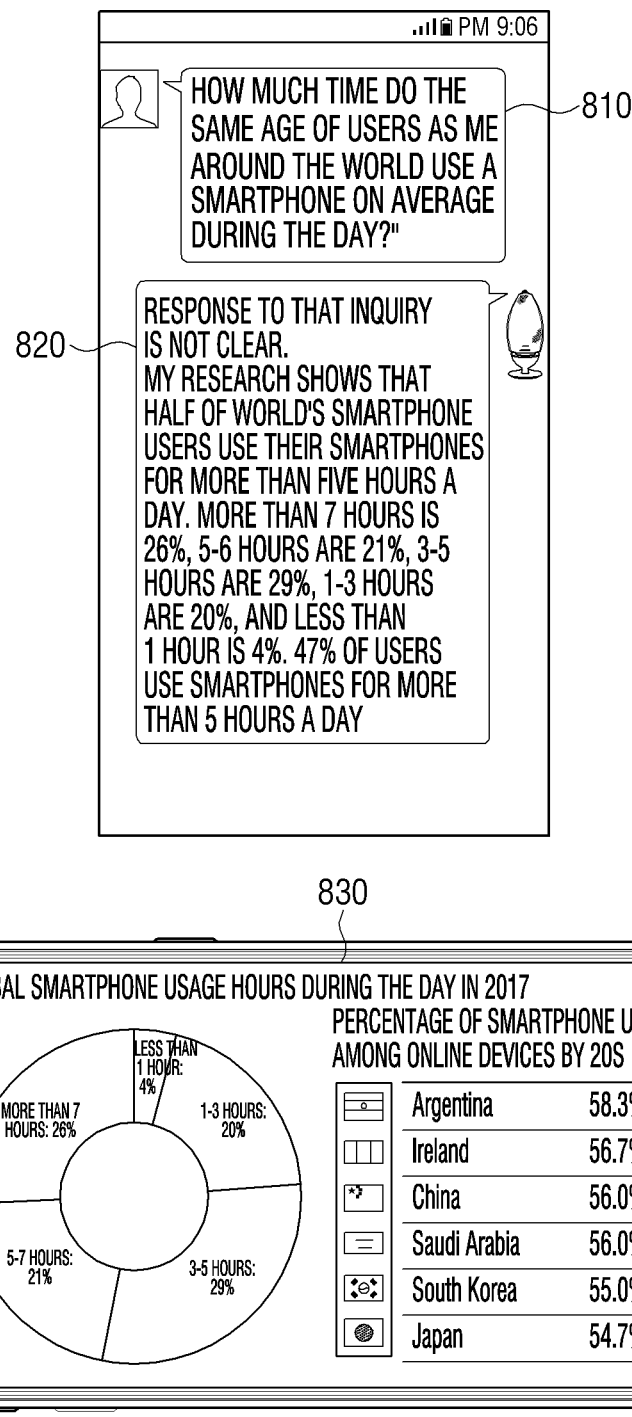

FIGS. 8 and 9 are diagrams illustrating examples of providing a response to a user inquiry based on knowledge information according to another embodiment of the disclosure.

For example, the server 100 may provide a statistical response based on the knowledge information stored in a plurality of GKBs corresponding to a plurality of user groups. For example, the server 100 may store the knowledge information obtained from the plurality of electronic devices in one of the plurality of GKBs corresponding to the plurality of user groups. For example, if a user agreement exists, the server 100 may store personal opinions (for example, political opinions), personal information (for example, smartphone use information) and the like in the GKB corresponding to the user group to which the user belongs.

If a user inquiry about personal information statistics is received from the third electronic device 200-3, the server 100 may provide the knowledge information based on the knowledge information stored in the plurality of GKBs. For example, as illustrated in FIG. 8, if a user inquiry 810 inquiring statistics on personal information "How long do the same age of users as me around the world use a smartphone on average during the day?" is received from the third electronic device 200-3, the server 100 may provide a response 820 to the user inquiry 810 based on the knowledge information of the GKB (for example, 20s GKB) corresponding to the user group to which the user belongs among the plurality of GKBs. In this example, as illustrated in FIG. 8, the response 820 to the user inquiry 810 may include information indicating that the response 820 is a statistical response and information on statistics. In addition, the server 100 may transmit the information on the statistics to the third electronic device 200-3 as information on various graphs and numerical values, and the third electronic device 200-3 may provide UI 830 including the information on various graphs and numerical values based on the received information as illustrated in FIG. 8.

If a user inquiry about personal opinion statistics is received from the third electronic device 200-4, the server 100 may provide the knowledge information based on the knowledge information stored in the plurality of GKBs. For example, as illustrated in FIG. 9, if a user inquiry 910 inquiring statistics about a political opinion "Will people agree to salvage the Sewol ferry?" is received from the fourth electronic device 200-4, the server 100 may provide a response 920 to the user inquiry 910 based on the knowledge information stored in the plurality of GKBs. In this example, as illustrated in FIG. 9, the response 920 to the user inquiry 910 may include information indicating that the response 920 is a statistical response and information on statistics for each user group. In addition, the server 100 may transmit the information on the statistics to the fourth electronic device 200-4 as information on various graphs and numerical values, and the fourth electronic device 200-4 may provide UI 930 including the information on various graphs and numerical values based on the received information as illustrated in FIG. 9. In addition, the server 100 may provide a feedback inquiry 940 requesting a response to a personal opinion to the fourth electronic device 200-4. In response, the server 100 may receive a feedback response 950 from the fourth electronic device 200-4 in response to the feedback inquiry 940, and may store the received feedback response 950 as knowledge information in the GKB corresponding to the user group to which the fourth electronic device 200-4 belongs.

FIG. 10 is a flowchart illustrating an example method of controlling a server for managing knowledge information, according to an embodiment.

The server 100 may receive the knowledge information from the first electronic device 200-1 (S1010). In this example, the server 100 may request the knowledge information to the first electronic device 200-1 to receive the knowledge information. However, this is merely an example, and the server 100 may immediately receive the knowledge information from the first electronic device 200-1.

The server 100 may store the received knowledge information in a personal knowledge database corresponding to a user who uses the first electronic device 200-1 (S1020). For example, the server 100 may transmit an inquiry message for registering the knowledge information to the first electronic device 200-1, and receive the confirmation message corresponding to the inquiry message to store the knowledge information in the server 100.

The server 100 may determine whether an inquiry to obtain knowledge information is received from the at least one second electronic device 200-2 (S1030).

If the user inquiry to obtain the knowledge information is received from at least one second electronic device 200-2 (S1030-Y), the server 100 may provide (e.g., transmit) a response to an inquiry to at least one second electronic device 200-2 based on the knowledge information stored in the personal knowledge database (S1040).

The server 100 may receive the feedback information on the response from the at least one second electronic device 200-2 (S1050).

The server 100 may store the knowledge information in the global knowledge database based on the feedback information (S1060). For example, if the feedback information indicating that the response to the inquiry is true is equal to or greater than the first threshold value, the server 100 may store the knowledge information in the global knowledge database. However, if the feedback information indicating that the response to the inquiry is true is less than the second threshold value, the server 100 may filter the knowledge information stored in the personal knowledge database.

Functions related to artificial intelligence according to the disclosure may be operated through the processor 120 and the memory 130. The processor 120 may be configured of one or a plurality of processors. In this example, one or the plurality of processors may, for example, and without limitation, be generic-purpose processors such as a CPU, an AP, and a digital signal processor (DSP), graphics dedicated processors such as a GPU, a vision processing unit (VPU), and/or an artificial intelligence dedicated processor such as an NPU. One or a plurality of processors may perform a control to process input data according to a predefined operation rule or an artificial intelligence model stored in the memory. If one or a plurality of processors is an artificial intelligence dedicated processor, the artificial intelligence dedicated processor may be designed with a hardware structure specialized for processing a specific artificial intelligence model.

The predefined operating rule or the artificial intelligence model may be characterized by being made through learning. For example, making the predefined operation rule or the artificial intelligence through the learning may refer, for example, to the predefined operation rule or the artificial intelligence model set to perform the desired characteristics (or purpose) by allowing a basic AI model to use and learn a plurality of learning data by a learning algorithm. Such learning may be made in the device itself in which the artificial intelligence according to the disclosure is performed, or may be made through a separate server and/or system. Examples of the learning algorithms include, for example, supervised learning, unsupervised learning, semi-supervised learning, reinforcement learning, or the like, but are not limited to the above examples.

The AI model may be configured of a plurality of neural network layers. Each of the plurality of neural network layers may have a plurality of weight values, and may perform a neural network operation through an operation between a calculation result of a previous layer and a plurality of weights. The plurality of weights of the plurality of neural network layers may be optimized and/or improved by learning results of the AI model. For example, the plurality of weights may be updated to reduce and/or minimize a loss value or a cost value obtained in the AI model during the learning process. The artificial neural network may include, for example, a include deep neural network (DNN), and examples of the artificial neural network may include a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-Network, and the like, but the artificial neural network are not limited to the above examples.

The term "unit" or "module" used in the disclosure may include units configured by hardware, software, or firmware, and may be used compatibly with terms such as, for example, logics, logic blocks, components, circuits, or the like. The "unit" or "module" may be an integrally configured component or a minimum unit performing one or more functions or a part thereof. For example, the module may be configured by an application-specific integrated circuit (ASIC).

Various embodiments of the disclosure may be implemented by software including instructions stored in a machine-readable storage medium (for example, a computer-readable storage medium). A machine may be a device that invokes the stored instruction from the storage medium and may be operated depending on the invoked instruction, and may include the server 100 or the electronic device (for example, the electronic device 200) according to the disclosed embodiments. In an example where a command is executed by the processor, the processor may directly perform a function corresponding to the command or other components may perform the function corresponding to the command under a control of the processor. The command may include a code made by a compiler or a code executable by an interpreter. The machine-readable storage medium may be provided in a form of a non-transitory storage medium. The 'non-transitory' storage medium is tangible storage medium, and does not distinguish whether data are semi-permanently or temporarily stored in the storage medium.

According to an embodiment, the methods according to the various example embodiments disclosed in the disclosure may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In a case of the online distribution, at least portions of the computer program product may be at least temporarily stored in a storage medium such as a memory of a server of a manufacturer, a server of an application store, or a relay server or be temporarily created.

Each of the components (for example, modules or programs) according to the various example embodiments may include a single entity or a plurality of entities, and some of the corresponding sub-components described above may be omitted or other sub-components may be further included in the diverse embodiments. Alternatively or additionally, some of the components (for example, the modules or the programs) may be integrated into one entity, and may perform functions performed by the respective corresponding components before being integrated in the same or similar manner. Operations performed by the modules, the programs, or the other components according to the diverse embodiments may be executed in a sequential manner, a parallel manner, an iterative manner, or a heuristic manner, at least some of the operations may be performed in a different order or be omitted, or other operations may be added.

While various example embodiments have been illustrated and described, it will be understood that the various example embodiments are intended to be illustrative, not limiting. It will be understood that various changes in form and detail may be made without departing from the true spirit and full scope of the disclosure of which the appended claims are a part.

What is claimed is:

1. A computer implemented method of controlling a server, the computer implemented method comprising:
receiving at least knowledge information from a first electronic device, the knowledge information corresponding to a single user of the first electronic device and including personal information of the user;
based on having authorization of the user to use personal information, storing the received knowledge information with the personal information in a personal knowledge database corresponding to the user of the first electronic device;
based at least on not having authorization of the user to use personal information, filtering the knowledge information to remove the personal information from the knowledge information and storing the filtered knowledge information in the personal knowledge database corresponding to the user of the first electronic device;
transmitting a response to an inquiry to obtain the knowledge information to at least one second electronic device based on the knowledge information stored in the personal knowledge database, based on the inquiry being received from the at least one second electronic device;
receiving feedback information to the response from the at least one second electronic device;
based on a ratio of feedback information indicating that the response to the inquiry is true among the received feedback information being equal to or greater than a first threshold value, identifying that the knowledge information stored in the personal knowledge database to be stored in a global knowledge database; and
updating the global knowledge database to store the knowledge information stored in the personal knowledge database.

2. The method of claim 1, further comprising:
filtering the knowledge information stored in the personal knowledge database based on the feedback information indicating that the response to the inquiry is true is less than a second threshold value.

3. The method of claim 1, wherein the response to the inquiry includes at least one of information indicating that the response is a personal opinion and information indicating that the response is fake.

4. The method of claim 1, further comprising:
transmitting the response to the inquiry and information on a probability that the response is true to a third electronic device based on the knowledge information stored in the global knowledge database and the feedback information based on the inquiry to obtain the knowledge information being received from the third electronic device after the knowledge information is stored in the global knowledge database.

5. The method of claim 1, wherein the global knowledge database is provided in a plurality of user groups,
in the storing, the knowledge information is stored in a global knowledge database corresponding to a user group to which the user of the first electronic device and a user of the second electronic device belong.

6. The method of claim 5, further comprising:
transmitting the response to the inquiry to a fourth electronic device based on the knowledge information stored in the global knowledge database corresponding to the user group based on the inquiry to obtain the knowledge information being received from the fourth electronic device used by another user belonging to the user group.

7. The method of claim 1, wherein the storing includes:
transmitting an inquiry message inquiring whether to store the received knowledge information in a personal knowledge database corresponding to the user of the first electronic device to the first electronic device; and storing the received knowledge information in the personal knowledge database corresponding to the user of the first electronic device based on a confirmation message being received from the first electronic device.

8. The method of claim 1, further comprising:
filtering the knowledge information in the personal knowledge database based on the knowledge information obtained from the first electronic device including one or more of antisocial information, or fake information.

9. A server configured to store knowledge information, comprising:
a communication interface comprising communication circuitry;
a memory configured to include at least one instruction; and
a processor connected to the communication interface and the memory, and configured to control the server,
wherein the processor is configured to execute the at least one instruction to control the server:
to receive knowledge information from a first electronic device through the communication interface, the knowledge information corresponding to a single user of the first electronic device and including personal information of the user,
based on having authorization of the user to use personal information, to store the received knowledge information with the personal information in a personal knowledge database corresponding to the user of the first electronic device,
based on not having authorization of the user to use personal information, to filter the knowledge information to remove the personal information from the knowledge information and to store the filtered knowledge information in the personal knowledge database corresponding to the user of the first electronic device,
to control the communication interface to transmit a response to an inquiry to obtain the knowledge information to at least one second electronic device based on the knowledge information stored in the personal knowledge database, based on the inquiry being received from the at least one second electronic device through the communication interface,
to receive feedback information on the response from the at least one second electronic device through the communication interface,
based on a ratio of feedback information indicating that the response to the inquiry is true among the received feedback information being equal to or greater than a first threshold value, identify that the knowledge information stored in the personal knowledge database to be stored in a global knowledge database, and
update the global knowledge database to store the knowledge information stored in the personal knowledge database.

10. The server of claim 9, wherein the processor is configured to filter the knowledge information stored in the personal knowledge database based on the feedback information indicating that the response to the inquiry is true is less than a second threshold value.

11. The server of claim 9, wherein the response to the inquiry includes at least one of information indicating that the response includes a personal opinion and information indicating that the response is fake.

12. The server of claim 9, wherein the processor is configured to control the communication interface to transmit the response to the inquiry and information on a probability that the response is true to a third electronic device based on the knowledge information stored in the global knowledge database and the feedback information based on the inquiry for obtaining the knowledge information being received from the third electronic device after the knowledge information is stored in the global knowledge database.

13. The server of claim 9, wherein the global knowledge database is provided in a plurality of user groups, and
the processor is configured to store the knowledge information in the global knowledge database corresponding to a user group to which the user of the first electronic device and a user of the second electronic device belong.

14. The server of claim 13, wherein the processor is configured to control the communication interface to transmit the response to the inquiry to a fourth electronic device based on the knowledge information stored in the global knowledge database corresponding to the user group based on the inquiry for obtaining the knowledge information being received from the fourth electronic device used by another user belonging to the user group.

15. The server of claim 9, wherein the processor is configured to control the communication interface to transmit an inquiry message inquiring whether the received knowledge information is stored in a personal knowledge database corresponding to a user of the first electronic device to the first electronic device, and
to store the received knowledge information in the personal knowledge database corresponding to the user of the first electronic device based on a confirmation message being received from the first electronic device through the communication interface.

16. The server of claim 9, wherein the processor is configured to filter the knowledge information in the personal knowledge database based on the knowledge information obtained from the first electronic device including one or more of antisocial information, or fake information.

* * * * *